May 19, 1925.
C. D. McCARTY ET AL
1,538,406
WELL FISHING TOOL
Filed June 19, 1924    2 Sheets-Sheet 2
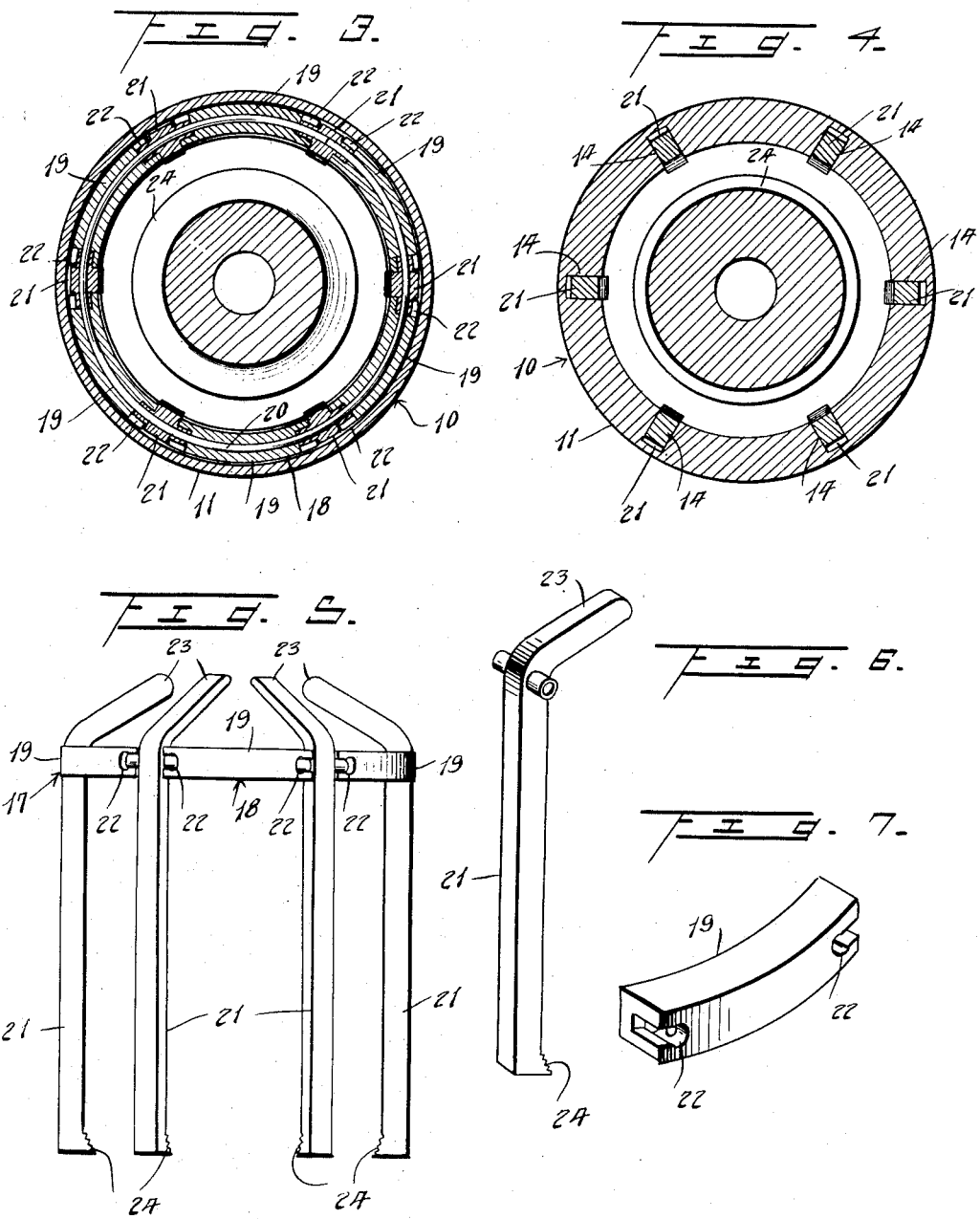
Inventor
C. D. McCarty, & J. W. Driggs.

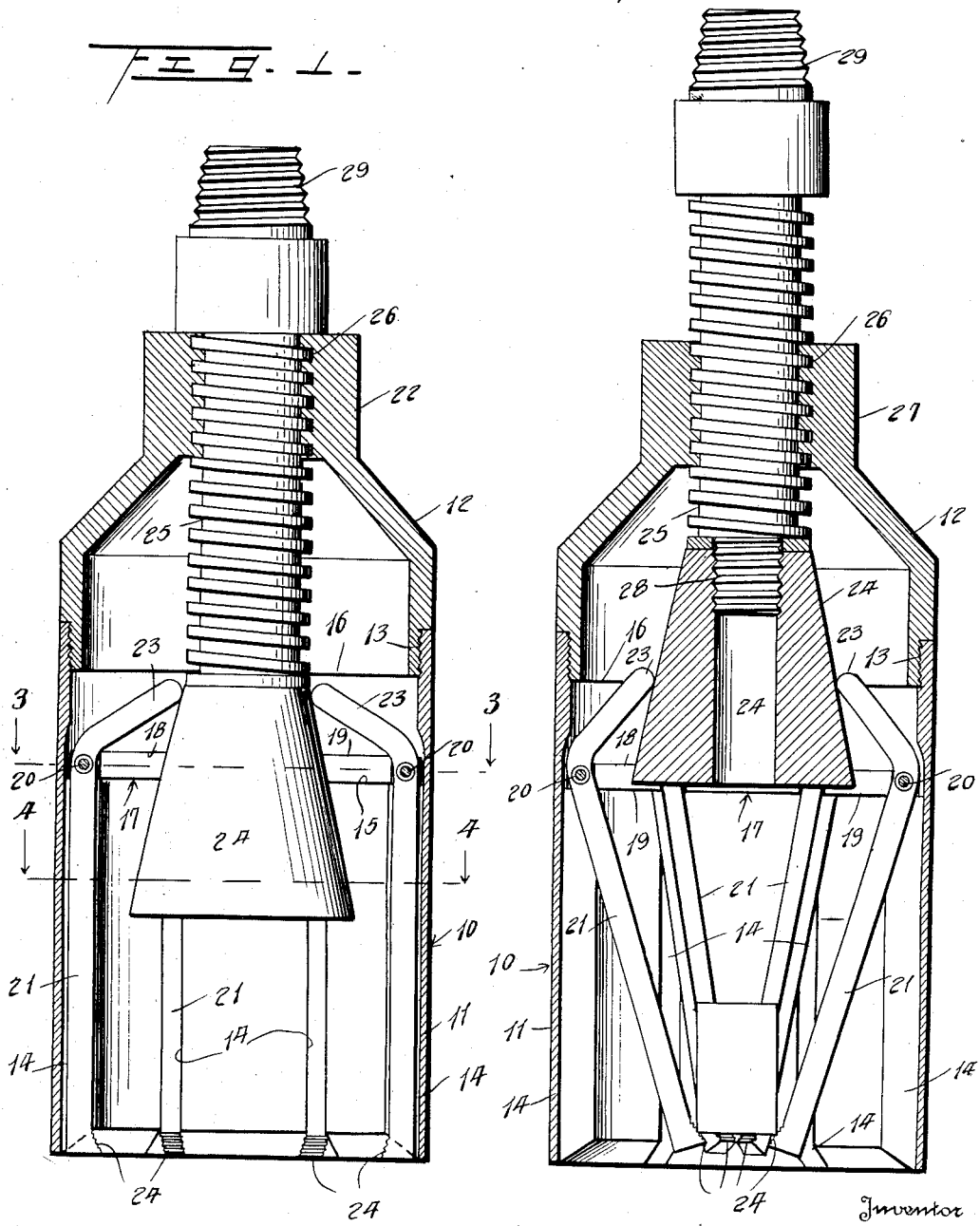

Patented May 19, 1925.

1,538,406

UNITED STATES PATENT OFFICE.

CHALMER D. McCARTY AND JOHN W. DRIGGS, OF SANTA PAULA, CALIFORNIA.

WELL-FISHING TOOL.

Application filed June 19, 1924. Serial No. 721,041.

*To all whom it may concern:*

Be it known that we, CHALMER D. McCARTY and JOHN W. DRIGGS, citizens of the United States, residing at Santa Paula, in the county of Ventura and State of California, have invented certain new and useful Improvements in Well-Fishing Tools; and we do hereby declare the following to be a full, clear, and exact description of the invention, such as will enable others skilled in the art to which it appertains to make and use the same.

This invention relates to a fishing tool used to remove other tools, nuts or the like which may have dropped to the bottom of a well.

It is aimed to provide a novel construction wherein the fingers employed may be secured in a retaining position with respect to a fished article while the tool is being removed.

Another object is to provide a novel construction wherein the fingers are unitarily connected together and capable of removal and co-act with cam means adapted to be secured in retaining engagement with a fished article.

More particular objects and advantages will become apparent from a consideration of the description following, taken in connection with the accompanying drawings illustrating an operative embodiment.

In said drawings:—

Figure 1 is a view of the tool in central longitudinal section, showing the parts in normal position;

Figure 2 is a similar view of the tool showing the parts in retaining engagement with a fished article;

Figure 3 is a cross sectional view taken on the line 3—3 of Figure 1;

Figure 4 is a cross sectional view taken on the line 4—4 of Figure 1;

Figure 5 is a perspective view showing the unitary finger structure;

Figure 6 is a perspective view of one of the fingers; and

Figure 7 is an enlarged perspective view of the retaining ring for said finger, illustrating the socket thereof.

Like reference characters designate like or similar parts in the different views.

Referring specifically to the drawings, 10 designates a barrel or bowl adapted to be suspended in a well from a fishing device. This barrel or bowl is in a plurality of separable sections, for instance a body section 11 and a top section 12, screw threaded together as at 13. The wall of the body section 11 has a suitable number of interior longitudinally extending grooves 14 and such wall at the upper end is generally reduced in thickness so as to provide a shoulder or ledge at 15. The lower end of the cap 12 extends inwardly of the adjacent inner wall of section 11 and provides a shoulder at 16.

A unitary fishing device is shown at 17 and consists of a ring 18 in sections 19 secured together by an annular rod or wire 20. Intermediate the sections 19, fishing fingers 21 are disposed, being journaled on a rod 20 and having extensions integral with the fingers and journaled or pivoted in recesses 22 extending inwardly from the outer surfaces of the sections 19 to extend the bearing of the fingers. The upper ends of the fingers are inwardly or angularly deflected as at 23 and their lower ends may be inwardly thickened and serrated as at 24. The ring 18 rests on the ledge 15 and is held against displacement in either direction by the shoulder ledges 15 and 16. The main portions of the gripping fingers are normally disposed in the grooves or slots 14.

Within the bowl or barrel is a truncated conical or cam head 24 with whose inclined or cam surfaces, the ends 23 co-act and usually engage. Head 24 is carried by a turnable shank 25 which is screw threaded at 26 in a collar 27 at the upper end of the cap sections 12. Connection between the head 24 and shank 25 may be made through the medium of a screw threaded stud 28 carried by the shank and threaded in a recess 29 of the head.

The upper end of the shank 25 as at 29 is screw threaded or otherwise finished for attachment to a fishing tool.

In operation, should a tool, nut or other article be lost or dropped to the bottom of a well, the present device is used by attaching the shank 25 at 29 to a fishing tool, which is disposed in the well and turned after it reaches the bottom. When the bowl reaches the bottom of the well, the head 24 is in the position shown in Figure 1 and the fingers are retracted in the grooves 14 due to gravity, because their pivots are nearer the top than the bottom. The article to be fished will be surrounded by the bowl, after which the fishing tool will be turned so as to turn the shank 25 and thus turn and elevate the head 24 causing the latter through its cam co-action with the ends 23 of the fingers, to move the fingers inwardly at their ends 24 and thereby engage the article. This retaining engagement by the fingers will be maintained since the cam 24 cannot be moved until the shank is turned in the reverse direction. As a result, the lost article may be readily engaged, and retained by the bowl while the latter is elevated from the well.

Various changes may be resorted to provided they fall within the spirit and scope of the invention.

We claim as our invention:—

1. A fishing tool having a bowl made in separable sections, the end of one of the sections constituting a shoulder, the other section having a shoulder opposed to the first mentioned shoulder, a ring located intermediate the shoulders, fishing fingers carried by the ring, and means to actuate the fishing fingers.

2. A fishing tool having fishing fingers, a ring carrying said fingers, means to actuate said fingers, said ring being in sections, a rod connecting the sections, said fingers being pivoted on said rod and between the sections, said sections having recesses, and extensions on the fingers disposed in said recesses.

3. A fishing tool consisting of a bowl having a body section, said body section having its wall reduced at the upper end and provided with a shoulder, a cap section screw threaded to said wall and having its lower end constituting a shoulder, a ring disposed intermediate said shoulders, the body section below the shoulders having longitudinally extending slots, fishing fingers pivoted to said ring and having portions normally occupying said slots, the upper portions of said fishing fingers extending inwardly, a cam head co-acting with said upper portions to project the lower ends of the fingers, a rotatable shank extending from the cam head, and said shank being screw threaded in the cap section.

In testimony whereof we affix our signatures in presence of two witnesses.

CHALMER D. McCARTY.
JOHN W. DRIGGS.

Witnesses:
ARTHUR H. BLANCHARD,
ROMA HALL.